US012798104B2

(12) United States Patent
Brugger et al.

(10) Patent No.: US 12,798,104 B2
(45) Date of Patent: Nov. 17, 2026

(54) METHOD FOR CALIBRATING A CONSTRUCTION ROBOT AND CONSTRUCTION ROBOT

(71) Applicant: Hilti Aktiengesellschaft, Schaan (LI)

(72) Inventors: Peter Brugger, Feldkirch (AT); Julia Zanona, Feldkirch (AT)

(73) Assignee: Hilti Corporation, Schaan (LI)

( * ) Notice: Subject to any disclaimer, the term of this patent is extended or adjusted under 35 U.S.C. 154(b) by 12 days.

(21) Appl. No.: 18/866,908

(22) PCT Filed: May 9, 2023

(86) PCT No.: PCT/EP2023/062224

§ 371 (c)(1),
(2) Date: Nov. 18, 2024

(87) PCT Pub. No.: WO2023/222445

PCT Pub. Date: Nov. 23, 2023

(65) Prior Publication Data

US 2025/0319604 A1 Oct. 16, 2025

(30) Foreign Application Priority Data

May 19, 2022 (EP) ..................................... 22174203
Jul. 27, 2022 (EP) ..................................... 22187200

(51) Int. Cl.
*B25J 9/00* (2006.01)
*B25J 9/16* (2006.01)
(Continued)

(52) U.S. Cl.
CPC ........... *B25J 9/1697* (2013.01); *B25J 9/1692* (2013.01); *B25J 11/005* (2013.01); *B25J 13/089* (2013.01); *B25J 19/023* (2013.01)

(58) Field of Classification Search
CPC ...... B25J 9/1697; B25J 9/1692; B25J 11/005; B25J 13/089; B25J 19/023; B25J 9/0057; B25J 5/00; G05B 2219/40298
See application file for complete search history.

(56) References Cited

U.S. PATENT DOCUMENTS 7,474,760 B2 * 1/2009 Hertzman ................ G06T 7/74 702/33
9,238,304 B1 * 1/2016 Bradski .................... B25J 9/162
(Continued)

FOREIGN PATENT DOCUMENTS

DE 10 2009 042 014 A1 3/2011
EP 2 292 387 A1 3/2011

OTHER PUBLICATIONS

International Search Report (PCT/ISA/210) issued in PCT Application No. PCT/EP2023/062224 dated Jun. 28, 2023, with English translation (4 pages).
(Continued)

*Primary Examiner* — Khoi H Tran
*Assistant Examiner* — Tien Minh Le
(74) *Attorney, Agent, or Firm* — Crowell & Moring LLP

(57) ABSTRACT

A construction robot for carrying out construction work on a construction site object includes a mobile platform, a manipulator which is movable relative to the mobile platform, and an optical sensor system which is at least partially disposed on the mobile platform. A control unit is configured to determine, using the optical sensor system, a position and/or an orientation of a tool disposed on the manipulator relative to the mobile platform.

9 Claims, 5 Drawing Sheets

(51) Int. Cl.

| | |
|---|---|
| ***B25J 11/00*** | (2006.01) |
| ***B25J 13/08*** | (2006.01) |
| ***B25J 19/02*** | (2006.01) |

(56) References Cited

U.S. PATENT DOCUMENTS

| | | | | |
|---|---|---|---|---|
| 2011/0066393 | A1* | 3/2011 | Groll ...................... | B25J 9/1692<br>73/1.79 |
| 2018/0326507 | A1* | 11/2018 | Halvorsen .............. | B25J 9/1679 |
| 2021/0323163 | A1 | 10/2021 | Halvorsen et al. | |
| 2022/0117682 | A1* | 4/2022 | Malackowski ........ | A61B 34/30 |

OTHER PUBLICATIONS

German-language Written Opinion (PCT/ISA/237) issued in PCT Application No. PCT/EP2023/062224 dated Jun. 28, 2023, with English translation (11 pages).

A. Moldagalieva et al., "Computer Vision-Based Pose Estimation of Tensegrity Robots Using Fiducial Markers", *2019 IEEE/SICE International Symposium on System Integration* (*SII*), *IEEE*, Jan. 14, 2019, pp. 478-483, XP033532490 (6 pages).

U.S. Patent Application, "Construction Robot With Parallel Manipulator", filed Nov. 18, 2024, Inventor Nitish Kumar, et al.

* cited by examiner

METHOD FOR CALIBRATING A CONSTRUCTION ROBOT AND CONSTRUCTION ROBOT

BACKGROUND AND SUMMARY OF THE INVENTION

The invention concerns a construction robot for carrying out construction work on a construction site object, comprising a mobile platform and a manipulator which is movable relative to the mobile platform. The invention also relates to a method for calibrating a construction robot.

It is often necessary for construction work on construction sites to be carried out with highly accurate positioning. For example, bores on the ceilings must often be produced with positional accuracy of 0.5 cm or better, so that for example ceiling elements to be arranged on the ceiling can be correctly fixed to the bores.

In order to achieve such positional accuracy with a construction robot which is to carry out such construction work using a manipulator, the manipulator must also be controllable with great precision. In particular, movements of the manipulator relative to a mobile platform of the construction robot must be controllable precisely and in particular in predictable fashion. Normally, the manipulator comprises actuators, e.g., stepper motors, by means of which a desired situation of the manipulator can be approached. Because of production tolerances however, systematic deviations specific to the respective manipulator may occur between the desired situation and the actual situation approached, in each case measured relative to the position and orientation of the mobile platform. Before first use of a construction robot or its manipulator, therefore the manipulator is calibrated; in particular, calibration data are generated for calibrating the adjustment movements of the manipulator, from which data correction information can later be derived in order to correct later adjustment movements accordingly.

Previously, calibration was carried out by connecting a calibrated duplicate of the manipulator to be calibrated to the manipulator. The position and orientation data determined for the manipulator and the duplicate are detected and compared during movement into multiple situations.

This method however requires such a calibrated duplicate, which substantially increases the costs of calibration. Also, calibration can only take place at the location of the duplicate, usually a manufacturing site or repair workshop, but not a construction site on which the construction robot is to be used. If for example the manipulator must be replaced because of damage or wear, because of calibration such an exchange cannot usually be carried out directly on site.

The object of the present invention is therefore to offer a low-cost construction robot which can carry out construction work with a particularly high degree of positional accuracy. Also, a method of calibrating a construction robot is proposed, by means of which a construction robot can be calibrated even on site in a particularly simple and economic fashion.

This object is achieved by a construction robot for carrying out construction work on a construction site object, comprising a mobile platform and a manipulator which is movable relative to the mobile platform, an optical sensor system arranged and/or formed at least partly on the mobile platform, and a control unit which is configured to determine, using the optical sensor system, a position and/or orientation of the manipulator, in particular a tool arranged on the manipulator, relative to the mobile platform.

By use of an optical sensor system, situations of a still uncalibrated manipulator can be determined largely without production tolerances, in particular mechanically induced tolerances. By at least partially arranging the optical sensor system on the mobile platform, these situations can be determined at arbitrary locations.

External additional devices, in particular calibrated duplicates, are not required. Thus, for example, a replacement manipulator can also be calibrated directly on a construction site on which the associated construction robot is to be used.

Calibration can thus be carried out using on-board means which are always available. To this extent, such a construction robot may also be described as a calibration-free construction robot, in particular in the sense that it does not require calibration with external additional devices.

One advantage of the construction robot is that this can determine a position and/or orientation of the manipulator, in particular the tool, relative to the mobile platform autonomously and independently of mechanical properties of the manipulator. So if the manipulator is replaced, it does not require calibration with additional devices, or in any case fewer calibration measures, in order to control the tool with the replacement manipulator precisely at desired positions. Also, the manipulator can be moved and the reached position of the manipulator and/or tool relative to the mobile platform determined using the sensor system, for example in a feedback loop. If the reached position deviates from the nominal position, a correction movement of the manipulator may take place repeatedly until the nominal position is reached.

An optical sensor system may mean a sensor system which is based on detection of electromagnetic waves. For example, a sensor system based on visible and/or infrared light and/or microwaves is conceivable.

The construction robot may have an end effector. The end effector may have at least one tool or tool receiver for receiving a tool. The end effector and the mobile platform may be connected together via the manipulator. In particular, a tool interface may be arranged and/or formed on the end effector for holding the tool and/or for energy transmission and/or for data transmission to and/or from the tool.

A tool may be an insertion tool such as for example a marking tool, a drill, a chisel, a saw blade or a grinding tool. Alternatively or additionally, a tool may be a power tool, in particular configured for receiving and/or using a tool, for example a marking machine, for example a controllable paint spray nozzle, a power drill, in particular a rock drill, in particular a hammer drill, a power chisel, a power grinder or similar.

The optical sensor system may be formed in multiple pieces. In particular, a part may be situated on the manipulator, on the end effector and/or on the tool. At least one other part may be situated on the mobile platform. Thus the optical sensor system may be configured particularly simply for determining with great accuracy, using the first-named part, the situation of the manipulator relative to the mobile platform corresponding to the at least one other part.

The optical sensor system may for example comprise a laser distance meter. Alternatively or additionally, it may comprise at least one image recording unit. For example, the image recording unit may comprise a black-white and/or color image camera.

In addition to the optical sensor system, the construction unit may have a non-optical sensor system. The control unit may be configured to determine, using the non-optical sensor system, a position and/or orientation of the manipulator, in particular a tool arranged on the manipulator, relative to the mobile platform. Then it is possible to determine a situation at least temporarily, if for example there is no clear visual contact between various parts of the optical sensor system. The non-optical sensor system may for example be a mechanical sensor system. It may be configured for example to determine situations of individual joints of the manipulator. It may comprise for this at least one proprioceptive sensor.

If the construction robot has an orientation sensor for determining an orientation of the construction robot, for example in the form of an acceleration sensor, in addition tilt angles of the construction robot relative to a base on which the construction robot is located, and/or relative to the horizontal, may also be determined. Thus a working position, for example a drilling position to be reached on a wall or ceiling, can be approached more precisely with the manipulator and in particular with the tool, since any tilt moments, in particular on long extension of the manipulator, relative to the base and/or to the horizontal can be determined and compensated.

Here, the orientation sensor may be configured to determine an orientation of the mobile platform and/or the manipulator, in particular the end effector, for example relative to a horizontal and/or a vertical. Accordingly, it may be arranged on the mobile platform and/or on the manipulator, in particular on the end effector.

The orientation sensor may for example be and/or comprise an acceleration sensor. The acceleration sensor may in particular be formed on the end effector and/or on the mobile platform. The acceleration sensor may be configured to detect accelerations in at least one direction, preferably two dimensions, in particular preferably three dimensions.

Changes in position and/or orientation detected by the sensor system and/or the acceleration sensor may be able to be compensated by an adjustment device of the construction robot.

A location marking, for example in the form of an AruCo marker, may be arranged and/or formed on the construction robot, in particular on the end effector and/or on the manipulator. In particular, the optical sensor system may include the location marking.

For example, the image recording unit may then detect the position and/or orientation contactlessly with high frequency, in particular with high accuracy. For this, the control unit may identify and locate the location marking by processing images recorded with the image recording unit.

Overall, such an optical sensor system may have low weight. In particular, the location marking may have a low weight so that only slight additional loads act on the manipulator or end effector because of the optical sensor system. Such an optical sensor system may also be particularly economical since cost-relevant precision elements, such as, for example, precision angle measuring units or LIDAR scanners, can be omitted.

In order to allow continuous monitoring of the position and/or orientation, the location marking may be at least partly, preferably completely, arranged in a field of view of the image recording unit.

The manipulator may have at least three, preferably at least six degrees of freedom. The degrees of freedom may exist in particular relative to the mobile platform. At least three degrees of freedom allow working on ceilings or walls without pivoting the mobile platform from the vertical into the horizontal or vice versa. With six degrees of freedom, work can be carried out both on the ceiling and on the walls without pivoting the mobile platform. Also, construction work can be carried out at positions otherwise difficult to reach, e.g., if otherwise, with fewer degrees of freedom, installation elements such as lines or cable guides would block the way to the desired position.

The end effector may also offer further degrees of freedom. For example, a telescopic element may be arranged on the end effector, by means of which for example the tool can be moved relative to the end effector.

The tool may for example be and/or comprise a marking tool, a drilling tool, a chiseling tool, a grinding tool and/or a cutting tool, in particular a saw blade.

In general, the construction robot may be configured for carrying out work in building construction and/or civil engineering. On such construction sites in particular, often on-site calibration is particularly important but previously could only be performed with difficulty.

Construction work at particularly great heights, in particular on hall ceilings, may be possible if the mobile platform is a flying platform. The flying platform may be a drone. It may have at least one propeller. Flying may then also include hovering.

The mobile platform may be designed for cable-connected and/or cable-free performance of construction work. For example, it may be connected to a supply line during operation. Alternatively or additionally, it may also comprise an accumulator, in particular lithium-based. It is also conceivable for the mobile platform to have a fuel cell.

Alternatively or additionally, it is also conceivable that the mobile platform comprises and/or is configured as a travelling platform, e.g., a tracked vehicle and/or a wheeled vehicle.

To extend its reach in the vertical, in particular when configured as a travelling platform, the mobile platform may have a lifting device.

The construction robot, in particular the end effector, may have a laser distance meter. In this case, at least one position marking may be arranged on the construction site so that a position and/or orientation of the construction robot relative to the position marking, preferably to multiple position markings, can be determined. Alternatively or additionally, it may be configured to be detected by a total station so that its position and/or orientation can be determined. For this, the construction robot may for example have a reflector, e.g., in the form of a prism. Thus a position and/or situation of the construction robot can be determined, in particular a position and/or an orientation relative to an absolute reference system of the construction site and/or the total station or the at least one position marking.

Because of concealment, work positions at which the construction work is to be carried out and to which therefore the tool or at least a tip of the tool must be brought, often do not lie in the field of view of the total station. Therefore the reflector or the laser distance meter may be arranged on the mobile platform to which often a visual connection can be created. Thus then at least one position and/or orientation of the mobile platform can be detected, and in addition, with knowledge of the relative offset of the mobile platform to the end effector, in particular to the tip of the tool, a position and/or orientation of the end effector, in particular a position and/or orientation of the tip of the tool, can also be determined.

The scope of the invention also covers a method for calibrating a construction robot of the type described above and/or below, wherein calibration data are generated for calibrating adjustment movements of the manipulator, in that the manipulator is brought into at least one first and then a second orientation, and when the respective orientation has been reached, at least one position and/or orientation of the manipulator, in particular a tool arranged on the manipulator, relative to the mobile platform is determined using the optical sensor system at least partially arranged and/or formed on the mobile platform of the construction robot.

Since only on-board means are required for performing the method, according to the method, the construction robot can also be calibrated on site, e.g., on a construction site. No specific cost-intensive components are required, so the method can be implemented particularly economically.

In a variant of the method, at least one of the positions and/or orientations is determined in that first image data of a location marking arranged and/or formed on the manipulator, and second image data of an external location marking arranged and/or formed in a vicinity of the construction robot, are recorded and evaluated. The first and second image data may in particular be recorded from the mobile platform, for example if the image recording unit is arranged and/or formed on the mobile platform.

Preferably, the external location marking is arranged at least temporarily, in particular during ongoing calibration, resting stationarily relative to the environment.

The additional use of the second image data in particular also allows detection of tilt movements of the entire construction robot relative to the environment and depending on movements of the manipulator, in particular depending on its respective extension. To this extent, use of an orientation sensor can be supplemented or replaced.

It is furthermore conceivable that the situations to be approached correspond to specific positions of the manipulator and/or the tool relative to the external location marking.

It is for example conceivable that a tool tip touches specific positions on the external location marking. From knowledge of the appearance of the location marking in conjunction with the second image data, then image processing can be carried out in a particularly simple fashion requiring little processing capacity. The positions and/or orientations of the respective situations, and in particular deviations of these positions and/or orientations from nominal values, can thereby be determined with particularly high precision.

Further features and advantages of the invention are apparent from the detailed description of working examples of the invention that follows, with reference to the figures of the drawing which shows details essential to the invention, and from the claims. The features shown therein should not necessarily be considered to be true to scale and are illustrated in such a manner that the special features according to the invention can be clearly visualized. The various features can be implemented individually in their own right or collectively in any combinations in variants of the invention.

Working examples of the invention are illustrated in the schematic drawings and elucidated in detail in the description that follows.

DETAILED DESCRIPTION OF THE DRAWINGS

Figure 1:
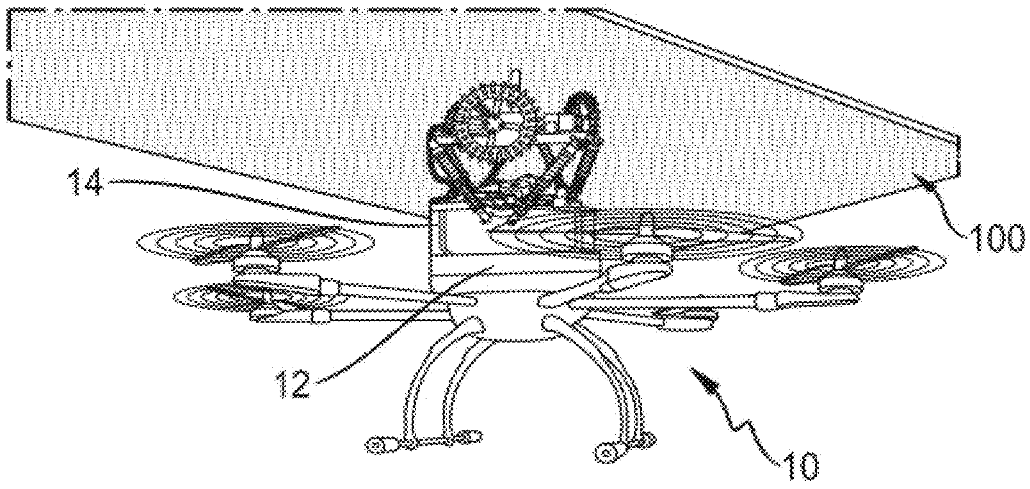
FIG. 1 shows a construction robot with a flying platform which carries out a construction task on a ceiling.

In the description of the figures that follows, comprehension of the invention is facilitated by use of the same reference numerals in each case for identical or functionally corresponding elements.

FIG. 1 shows a construction robot 10 which carries out a construction task on a ceiling 100, i.e., a construction site object, of a building in construction, in particular on a construction site inside the building. The construction task consists of creating markings corresponding to existing CAD plan data on the underside of the ceiling 100.

The construction robot 10 is configured as a drone, i.e., an unmanned flying object. For this, it has a mobile platform 12 in the form of a hexacopter. An end effector platform 14 is arranged on the mobile platform 12.

Figure 2:
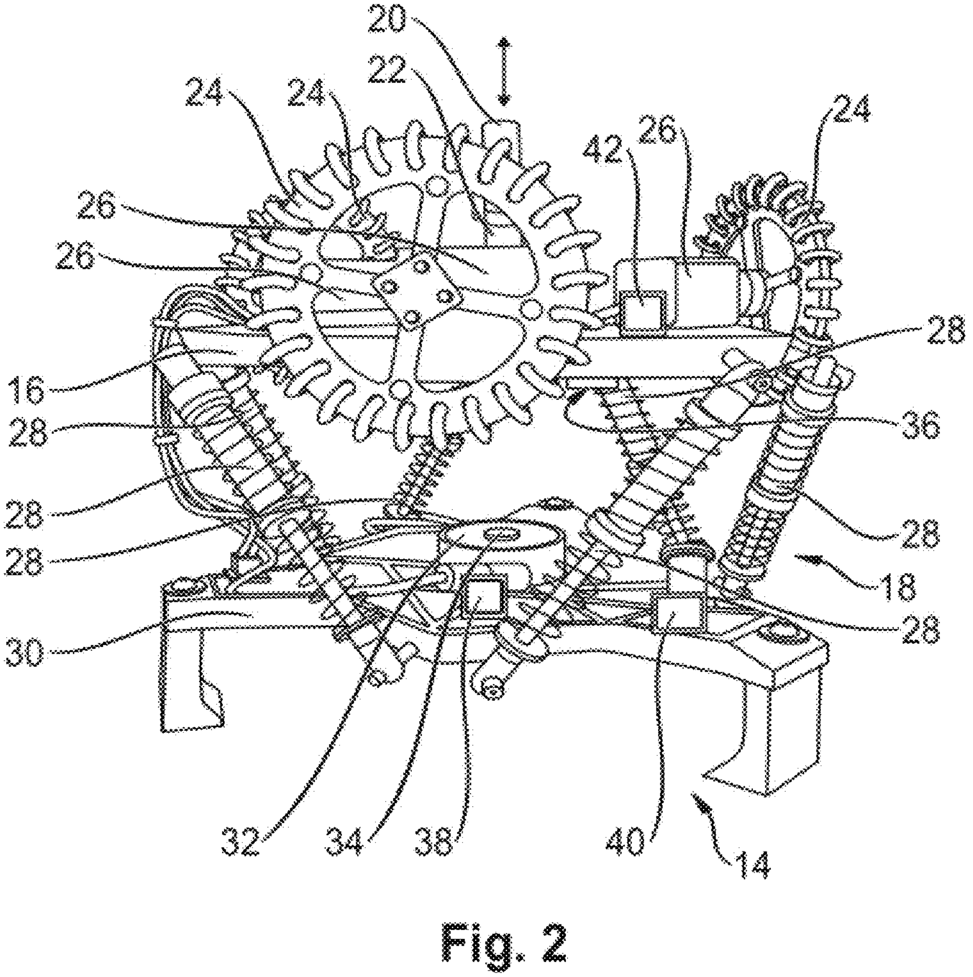
FIG. 2 shows an end effector platform of the construction robot.

FIG. 2 shows the end effector platform 14 in a perspective view from the side.

The end effector platform 14 comprises an end effector 16. The end effector 16 is connected to the mobile platform 12 via a manipulator 18, in particular a parallel manipulator, of the construction robot 10.

The construction robot 10 is configured to create markings on the ceiling 100 according to the CAD data transmitted to the construction robot 10. For this, the end effector 16 has a marker pen 20.

The marker pen 20 is arranged on a lifting device 22. Thus in the situation of the construction robot 10 shown in FIG. 1, the marker pen 20 can be moved towards and/or away from the ceiling 100, in particular without the end effector platform 14 as a whole having to be moved. This movement possibility is symbolized in FIG. 2 by a double arrow.

The marker pen 20 is configured as a colored pen so that it can apply a colored marking to the ceiling 100 as soon as it touches the ceiling 100. In order to allow an adequate color application and protect the marker pen 20 from excessive mechanical loads, the marker pen 20 may be arranged on the lifting device 22 in sprung fashion, e.g., by means of a foam material and/or a metal element. The marker pen 20 thus constitutes a marking tool which is received in a tool receiver (not visible in the illustration of FIG. 2) which in turn is arranged on the lifting device 22.

The end effector 16 furthermore has three contact elements 24. The contact elements 24 are configured as wheels, in particular as omnidirectional wheels. As evident in particular also from FIG. 1, during performance of the construction task, i.e., during marking of the ceiling 100, the contact elements 24 contact the ceiling 100. They can be driven individually by motors 26. Thus by means of the motorized contact elements 24, i.e., in this exemplary embodiment by means of the omnidirectional wheels, the end effector 16 can move along the ceiling 100 (FIG. 1) in at least two dimensions.

The manipulator 18 takes the form of a hexapod. It has six support arms 28. In this exemplary embodiment, the support arms 28 are not driven but are rotatably mounted on bearing points of the end effector 16 firstly and on bearing points of a fastening device 30 below the end effector 16. Thus the end effector 16 is movable relative to the fastening device 30, in particular with at least six degrees of freedom, but remains supported by the support arms 28. The manipulator 18 is thus configured as a passive system.

The support arms 28 are configured as in particular fluid-damped shock absorbers. For damping, they have a fluid-filled, in particular water-filled piston, and spring elements arranged on the outside. The pistons together with the respective spring element thus form damping elements. In addition, on deflection of the end effector 16 relative to the fastening device 30 out of a rest position, the spring elements ensure automatic return to the rest position. The spring constant of the support arms 28 may be set such that in the rest position, they are retracted to around half the total length of the support arms 28 under the weight of the end effector 16 or alternatively the own weight of the end effector 16 plus an additional load force to be expected, e.g., 15 N. They may be configured such that, starting from the rest position, the end effector 16 can be moved sufficiently far, for example by 2 to 4 cm in the X and Y directions of a plane parallel to the end effector 16.

The support arms 28 are arranged such that in the rest position, the end effector platform 14 is in a stable state. In particular, the support arms 28 are arranged such that the end effector 16 does not autonomously tilt towards one side.

Suitable positions and/or orientations for the support arms 28, for ensuring such a stable rest position, are found if a total energy balance of the arrangement is produced, in particular comprising an orientation energy of the end effector and in some cases the support arms 28 depending on their position and/or orientation, and a clamping energy of the spring elements of the support arms 28, and a global minimum, at least however a local minimum, of the total energy is sought depending on the positioning and alignment of the support arms 28.

The fastening device 30 is used to fasten the end effector platform 14 to the mobile platform 12 (see FIG. 1). The fastening may be releasable so that the end effector platform 14 can also later be mounted on other mobile platforms, e.g., octacopters, or on another ground-supported mobile platform, e.g., a wheeled and/or tracked vehicle.

The fastening device 30 forms a lower level below the end effector 16. It has lighting 32 and a camera 34. The camera 34 is an image recording unit. The lighting 32 and the camera 34 are oriented upward, i.e., towards the underside of the end effector 16. A location marking 36 is situated on the underside of the end effector 16, in particular in the field of view of the camera 34.

Figure 3:
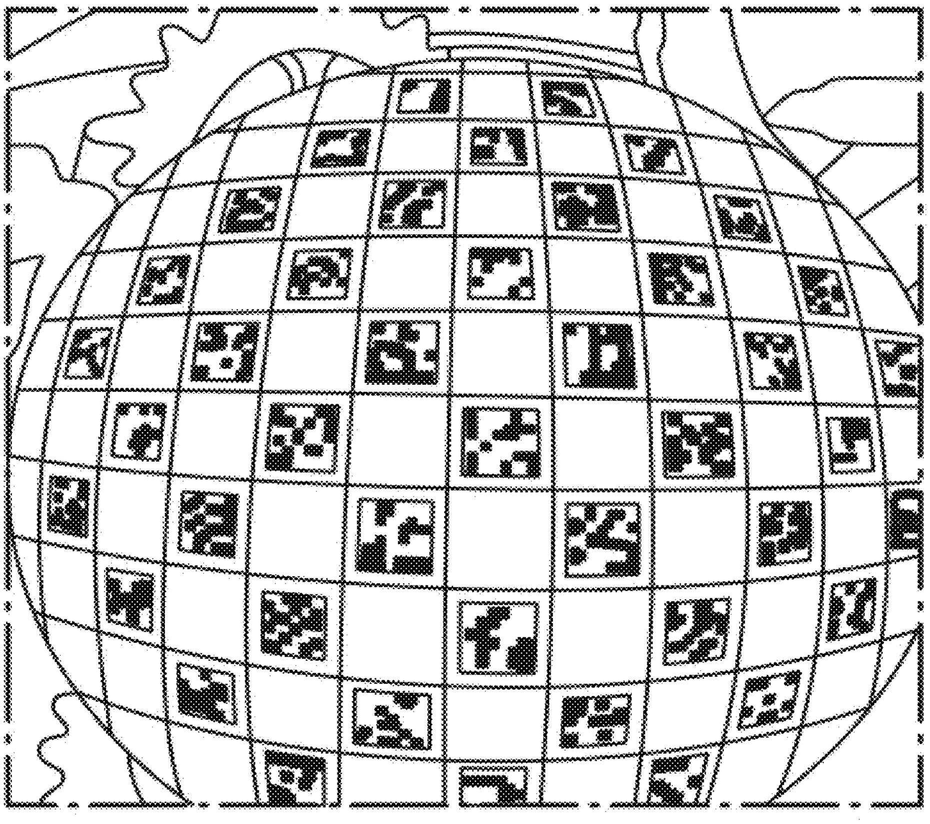
FIG. 3 shows a location marking.

FIG. 3 shows as an example an image of the location marking 36 recorded by the camera 34. The location marking 36 has a chequerboard pattern of register marks, for example in the form of AruCo markers. Other designs of the location marking are also conceivable. Preferably, the location marking is configured such that it can be easily identified even with high sensitivity and specificity, and in particular distinguished from an environment typical of construction sites. Also, it preferably has at least one clearly identifiable section of known length so that at least this section can be used for calibrating distance estimates. In general, the location marking can be identified and located by image processing. Preferably, the location marking has an at least two-dimensional pattern so that its orientation or attitude in space can also be determined by image processing. Accordingly, it is also conceivable that a moved, visibly arranged part of the manipulator and/or tool is used as a location marking insofar as its design, in particular at least one dimension, is known and constant and this part fulfils the above-mentioned requirements for identifiability and locatability.

A control unit 38 is shown schematically in FIG. 2 and is configured to evaluate images recorded by the camera 34, and by image processing, from the nature, size, orientation and/or position of known elements of the location marking, here for example the register marks, determine a position and/or orientation of the end effector 16 relative to the fastening device 30.

Furthermore, a reflection element 40 is arranged on the fastening device 30 and is configured to be detected, e.g., by a total station, situated in particular outside the construction robot 10, so that the position and/or orientation of the reflection element 40 and hence the position and/or orientation of the fastening device 30 relative to an environment-related origin can be determined.

The control unit 38 may be configured to obtain position and/or orientation data from such a total station and from this, in conjunction with the determined relative position and/or orientation of the end effector 16 relative to the fastening device 30, determine an absolute position and/or orientation of the end effector 16 and hence also, taking into account the situation of the lifting device 22, determine a position and/or orientation of the marker pen 20 relative to the total station, the ceiling 100 and/or another stationary reference system of the construction site.

The control unit 38 may comprise a microcontroller. In particular, it may have a microprocessor and program code stored in a memory unit of the control unit 38 and executable on the microprocessor.

In order to achieve maximum autonomy of the end effector platform 14, the end effector platform 14 may have a further energy source which is independent of the mobile platform 12, for example a rechargeable battery.

The control unit 38, the camera 34 and the location marking 36 form an optical sensor system which is configured to detect a position and/or situation of the end effector 16 relative to the mobile platform 12.

The end effector 16 may furthermore have an acceleration sensor 42, which for example measures three-dimensionally (shown merely schematically in FIG. 2). Thus accelerations of the end effector 16 can be measured. By means of the measured accelerations, the determination of the position and/or orientation of the end effector 16 and hence of the marker pen 20, in particular by the control unit 38, can be further improved.

Figure 4:
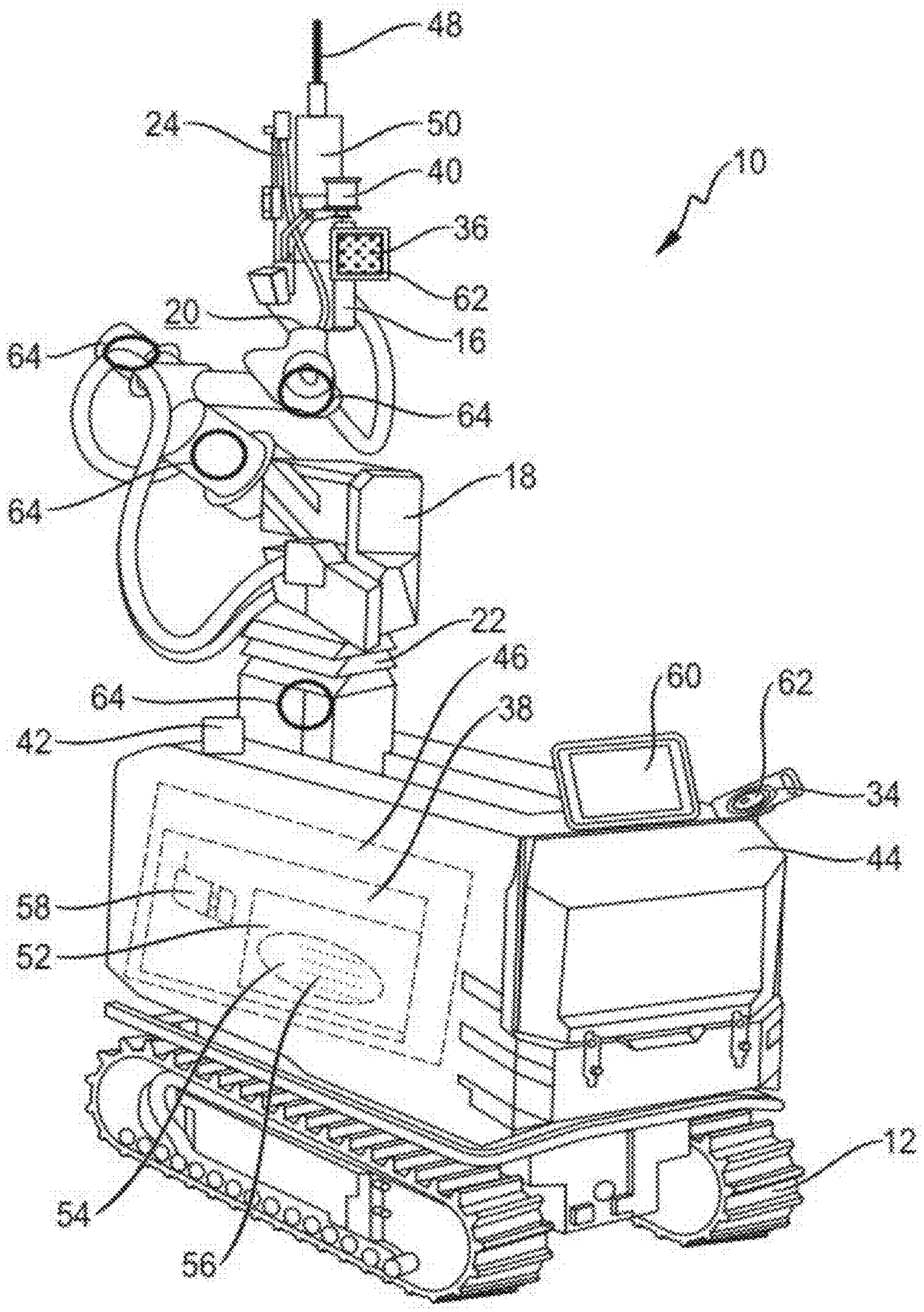
FIG. 4 show a construction robot with a travelling platform.

FIG. 4 shows a further construction robot 10. In this exemplary embodiment, the construction robot 10 has a mobile platform 12 in the form of a travelling platform, in particular a chassis configured as a tracked chassis.

A control chamber 46 (illustrated merely schematically in FIG. 4) is formed in a housing 44. On the upper side of the housing 44 is a manipulator 18. The manipulator 18 is designed as a multi-axially controllable arm, at the free end of which an end effector 16 with a tool, in particular in the form of a power drilling tool 48 and a dust extraction device 50, is arranged. To extend the reach, the manipulator 18 has a lifting device 22 via which the other part of the manipulator 18 can be displaced vertically.

The construction robot 10 is not limited to this configuration. In particular, instead of or in addition to the drilling tool 48, it may comprise one or more other electrical power tools and/or one or more other devices for performing construction tasks, in particular for performing inspection tasks, a measuring tool such as for example an image sensor and/or a length meter, for example a transit time distance meter or a LIDAR, a cutting tool, a drilling tool, a grinding tool or another tool suitable for performing construction tasks.

The construction robot 10 is designed for performing construction tasks, in particular drilling work in ceilings and walls, on a construction site, for example on a building construction site. In addition to the manipulator 18 for performing the construction tasks assigned to the construction robot 10, it has a control unit 38 arranged within the housing 14, in particular in the control space 16. The control unit 38 comprises a microcontroller 52.

The control unit 38 is equipped with executable program code 56 which is stored so as to be executable in a memory unit 54 of the microcontroller 52.

The program code 56 is configured such that, on execution of the program code 56 on the microcontroller 52, the construction robot 10 carries out a calibration of the manipulator 18 according to the method described in connection with FIG. 6.

The control unit 38 furthermore has a communication interface 58 for communication with a remote computer system.

Since the control unit 38, the microcontroller 52 with the memory unit 54 and the program code 56, and the communication interface 58 are arranged in the control space 46 and therefore within the housing 44, these, including the control space 46, are shown merely schematically in FIG. 4.

The construction robot 10 also has a display unit 60, which is designed as a touchscreen. The display unit 60 is in turn connected to the control unit 38. The control unit 38 can be operated via the display unit 60. Alternatively or additionally, the control unit 38 and hence the construction robot 10 may also be remotely controllable, in particular by remote control via the communication interface 58.

A location marking 36 is arranged on the end effector 16, preferably rigidly relative to the drilling tool 48. The location marking 36 may correspond to the location marking 36 described above in connection with FIG. 3.

A reflection element 40, corresponding to the above-described reflection element, is also arranged on the end effector 16. It is also conceivable that the location marking 36 is formed as part and/or in the manner of the reflection element 40.

A camera 34 is arranged on the mobile platform 12. It is configured, in particular arranged and/or equipped with a field of view, such that the location marking 36 lies in the field of view of the camera 34 at least in a minimum of two different, preferably in all relevant, situations of the manipulator 18.

The camera 34 and the location marking 36 thus form an optical sensor system 62 which is at least partially (because of the camera 34) arranged on the mobile platform 12 and is configured to detect a position and/or situation of the end effector 16 relative to the mobile platform 12.

Using the image data collected by the camera 34, and by means of the program code 56 and using the optical sensor system 62, the control unit 38 may thus determine a position and/or an orientation of the manipulator 18 or end effector 16, in particular a tool arranged on the manipulator 18, here the drilling tool 48, relative to the mobile platform 12.

An orientation of the mobile platform 12 can be determined by means of an orientation sensor in the form of an acceleration sensor 42. In particular, angle data, such as, e.g., roll, pitch or yaw angles of the mobile platform 12, can be measured by means of the acceleration sensor 42.

The program code 56 and hence the control unit 38 are configured to modify calibration data as required using these angle data of the acceleration sensor 42, and/or correct the control of the manipulator 18 appropriately in order to reach a desired situation.

The construction robot 10, in particular the manipulator 18, furthermore comprises a non-optical sensor system 64. This is also illustrated purely schematically in FIG. 4. It is configured to measure situations and situation changes of the joints of the manipulator 18 and its lifting device 22.

The program code 56 and hence the control unit 38 are configured to determine at least one position and/or orientation of the manipulator 18 and/or drilling tool 48 also by means of the non-optical sensor system 64. Thus it is conceivable, in particular in the case of a visual connection between the location marking 36 and the camera 34, to calibrate the determination from the non-optical sensor system 64 using the optical sensor system 62. For example, to carry out construction work, the manipulator 18 may then be controlled by the control unit 38 using data of the non-optical sensor system 64 calibrated in this way.

Figure 5:
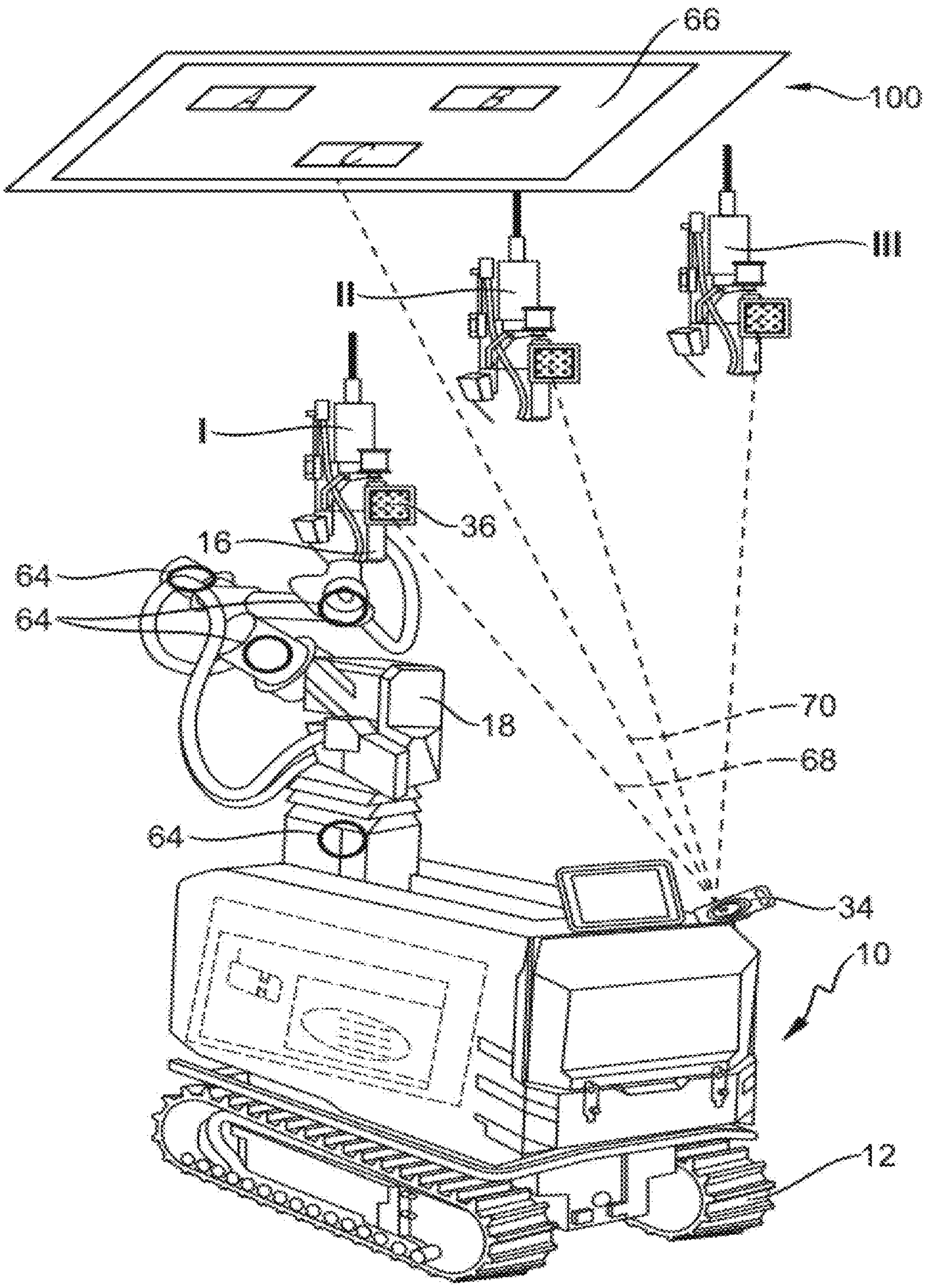
FIG. 5 shows a further construction robot with a travelling platform.

FIG. 5 shows a further construction robot 10 with a travelling platform as a mobile platform 12. Unless described otherwise below, this embodiment may correspond to the above-described embodiment according to FIG. 4.

In this construction robot 10, at least for calibration of the manipulator 18, there is no need for an acceleration sensor corresponding to the acceleration sensor 42 (FIG. 4), wherein however a high calibration quality can still be achieved.

An external location marking 66 can be seen in FIG. 5. The external location marking 66 may also have one or more register marks, e.g., in the form of AruCo markers. For example, three register marks A, B, C are shown.

The external location marking 66 is arranged separately from the construction robot 10. It may for example be situated on a ceiling 100 of a construction site on which the construction robot 10 is to be used. In principle, the external location marking 66 may have one or more of the features of the location marking 36. Preferably, the external location marking 66 is formed considerably larger. It may for example have dimensions of the order of $10^0 \times 10^0$ m$^2$, whereas the location marking 36 may have dimensions of the order of $10^0 \times 10^0$ cm$^2$.

Both the location marking 36 and the external location marking 66 are preferably situated in the field of view of the camera 34. The camera 34 may thus record first image data 68 of the location marking 36 and second image data 70 of the external location marking 66.

FIG. 5 furthermore shows schematically that the manipulator 18 with the end effector 16 can be controlled in various situations I, II, III, wherein moreover the location marking 36 and furthermore also the external location marking 66, resting stationarily relative to an environment of the construction robot 10, remain in the field of view of the camera 34.

Also, with this construction robot, the manipulator 10 and in particular its non-optical sensor system 64 may be calibrated according to the method described below.

Figure 6:
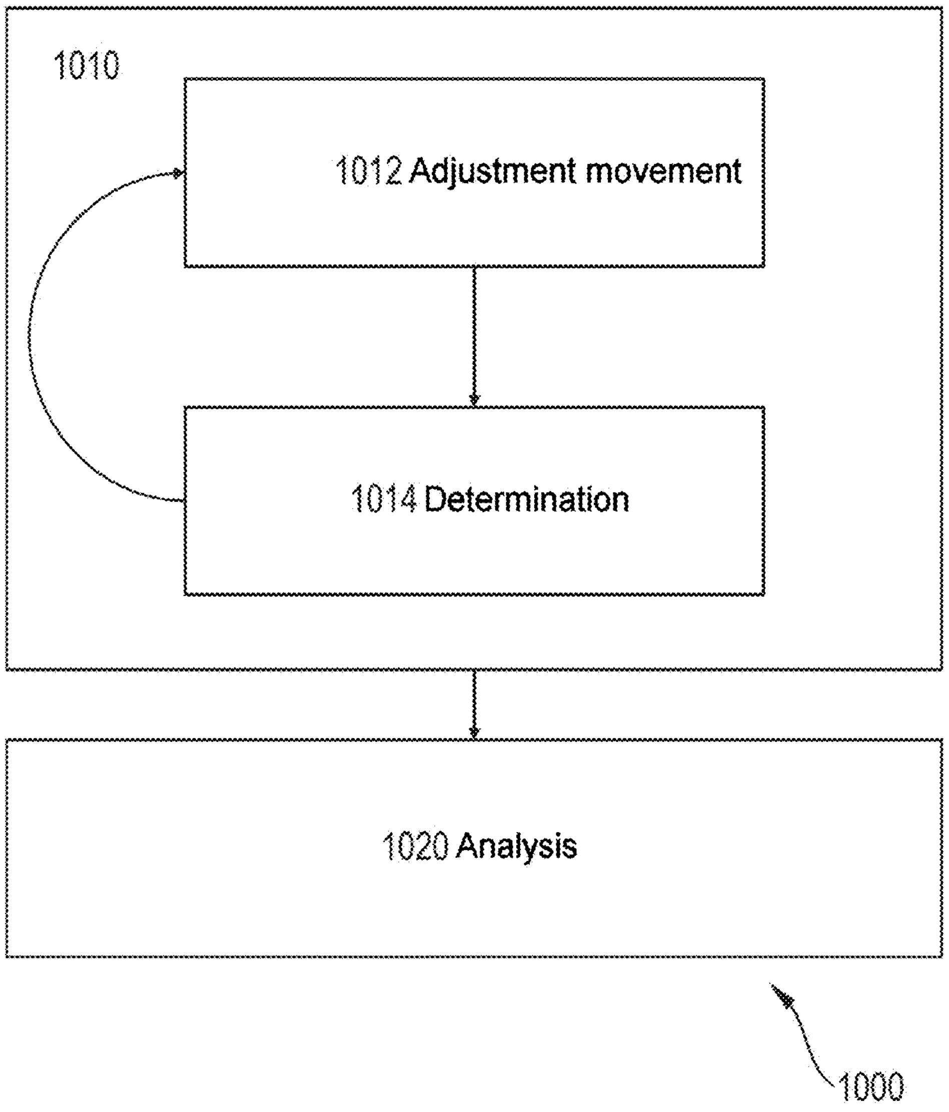
FIG. 6 shows a method for calibrating a construction robot.

Here, FIG. 6 shows a method 1000 for calibrating a construction robot of the type described above The method 1000 is explained in more detail below using the reference signs introduced above.

The method is described using the example in which the manipulator 18 of the construction robot 10 is to be exchanged and production tolerances, which must therefore be calibrated, exist between measurement values of the non-optical sensor system 64 or associated desired situations of the manipulator 18, and the actually assumed positions and/or orientations of the manipulator 18.

Alternatively or additionally, it is also conceivable that calibration may take place not only with respect to the situation of the actual manipulator 18 but also or alternatively for example with respect to the situation of a tool which may, for example, be arranged on the manipulator 18 by means of the end effector 16, for example with respect to the drilling tool 48.

For example, it is furthermore assumed that only three situations are used for calibration, in particular situations I, II and III.

In the measurement phase 1010, successively by means of adjustment movements 1012, the manipulator 18 is brought into one of the situations I, II or III which in particular has not previously been used.

On reaching the respective situation I, II or III, the position and orientation of the manipulator 18 relative to the mobile platform 12 are determined 1014 using the optical sensor system 62. In addition, in each of the situations I, II or III, the measurement values of the non-optical sensor system 64 (to be calibrated) are detected.

This is repeated until all situations to be analyzed, i.e., in this example a total of three situations, have been approached and their position and orientation determined.

For the determination 1014, first image data 68 of the location marking 36 may be recorded by the camera 34. The first image data 68 may then be evaluated by the control unit 38 by image processing, thereby obtaining distance and attitude data for the orientation and position of the location marking 36 relative to the camera 34, and hence data for the orientation and position of the manipulator 18 relative to the mobile platform 12. To determine absolute distances and angles, in particular known sections, for example specific dimensions, of the location marking 36 may be used as a basis for estimate. For example, by means of a suitably trained deep-learning algorithm, firstly the location marking 36 may be determined. From the type and nature of perspective distortion of the image of the location marking 36 within the first image data 68, then a relative orientation and relative distance from the camera 34 can be derived. Then from these in turn, the desired distance and attitude data can be derived.

Insofar as an orientation sensor is available, its measurement data may also be recorded in the determination 1014.

Insofar as an external location marking 66 is available, the camera 34 may also collect second image data 70 in which the external location marking 66 is depicted. It is conceivable that, in the case that the location marking 36 and the external location marking 66 are already both depicted in the first image data 68 at least to an adequate extent, both the first image data 68 and also the second image data 70 are used. Evaluation of the second image data 70 may take place in similar fashion to the evaluation of the first image data 68, here purely relative to the external location marking 66.

In a subsequent analysis 1020, the collected orientation and position data of the optical sensor system 62 firstly and from the non-optical sensor system 66 secondly, are then compared. From the comparison, the desired calibration data can then be derived.

Insofar as angle data from the orientation sensor are available, these may be integrated in the calibration data in order to additionally compensate for corresponding tilt movements of the mobile platform 12 for later control of the manipulator 38.

If an external location marking 66 is used, angle data may also be determined for tilt movements performed during calibration, in that deviations of the relative orientations and positions of the external location marking 66, i.e., between different sets of second image data 70, are evaluated. Using these data again, additional compensation for tilt movements of the mobile platform 12 may take place.

The calibration data obtained may be used later to modify control of the manipulator 18 on the basis of measurement values of the non-optical sensor system 64. In particular, the control may be modified such that a target situation reached with the use of the non-optical sensor system 64 corresponds to an actually desired situation according to measurement values based on the optical sensor system 62 as "ground truth". In other words, the calibration data may then be used to compensate for previously established production tolerances.

In a variant of the method 1000, it is also conceivable to approach situations successively with the manipulator 18, wherein the situations correspond to particular configurations relative to the external location marking 66. Such configurations may, for example, be that a tool tip of the drilling tool 48 touches one of the register marks A, B, C in a specific fashion. In order to approach these situations, using the camera 34, the tool tip may be monitored and the manipulator 38 controlled accordingly by the control unit 38 using ongoing image processing until such optical monitoring reveals that the desired configuration has been reached. Then the position and orientation of the manipulator 18 may be determined using the measurement values supplied by the non-optical sensor system 64. Using defined distances and/or geometries of configurations, in particular of the register marks relative to one another, and by comparison with the associated measurement values of the non-optical sensor system 64, then again deviations may be determined and calibration data derived therefrom.

LIST OF REFERENCE CHARACTERS

10 Construction robot
12 Mobile platform
14 End effector platform
16 End effector
18 Manipulator
20 Marker pen
22 Lifting device
24 Contact element
26 Motor
28 Support arm
30 Fastening device
32 Lighting
34 Camera
36 Location marking
38 Control unit
40 Reflection element
42 Acceleration sensor
44 Housing
46 Control space
48 Drilling tool
50 Dust extraction device
52 Microcontroller
54 Memory unit
56 Program code
58 Communication interface
60 Display unit
62 Optical sensor system
64 Non-optical sensor system
66 External location marking
68 First image data
70 Second image data
100 Ceiling
1000 Method
1010 Measurement phase
1012 Adjustment movement

1014 Determination
1020 Analysis
A, B,
C Register mark
I, II, III Situation

The invention claimed is:

1. A construction robot (10) for carrying out construction work on a construction site object, comprising:
- a mobile platform (12);
- a manipulator (18) which is movable relative to the mobile platform (12);
- a tool disposed on the manipulator (18);
- an optical sensor system (62) which is at least partially disposed on the mobile platform (12); and
- a control unit (38) which is configured to determine, using the optical sensor system (62), a position and/or an orientation of the tool disposed on the manipulator (18) relative to the mobile platform (12) and which is configured to carry out a calibration of the manipulator (18) based on the position and/or the orientation of the tool disposed on the manipulator (18) relative to the mobile platform (12).

2. The construction robot (10) as claimed in claim 1, further comprising a non-optical sensor system (64), wherein the control unit (38) is configured to determine, using the non-optical sensor system (64), the position and/or the orientation of the tool disposed on the manipulator (18) relative to the mobile platform (12).

3. The construction robot (10) as claimed in claim 1, further comprising an orientation sensor, wherein an orientation of the construction robot (10) is determinable by the orientation sensor.

4. The construction robot (10) as claimed in claim 1, wherein the optical sensor system (62) comprises a location marking (36).

5. The construction robot (10) as claimed in claim 4, wherein the location marking (36) is disposed on an end effector (16) of the manipulator (18).

6. The construction robot (10) as claimed in claim 1, wherein the manipulator (18) has at least three degrees of freedom.

7. The construction robot (10) as claimed in claim 1, wherein the tool is a marking tool or a drilling tool or a chiseling tool or a grinding tool or a cutting tool.

8. A method (1000) for calibrating a construction robot (10), wherein the construction robot comprises:
- a mobile platform (12);
- a manipulator (18) which is movable relative to the mobile platform (12);
- a tool disposed on the manipulator (18);
- an optical sensor system (62) which is at least partially disposed on the mobile platform (12); and
- a control unit (38) which is configured to determine, using the optical sensor system (62), a position and/or an orientation of the tool disposed on the manipulator (18) relative to the mobile platform (12) and which is configured to carry out a calibration of the manipulator (18) based on the position and/or the orientation of the tool disposed on the manipulator (18) relative to the mobile platform (12);

the method comprising the steps of:
- generating calibration data for calibrating adjustment movements (1012) of the manipulator (18); and
- bringing the manipulator (18) into at least one situation (I, II, III), and when the at least one situation (I, II, III) has been reached, determining the position and/or the orientation of the tool disposed on the manipulator (18) relative to the mobile platform (12) using the optical sensor system (62) by the control unit (38) and calibrating the manipulator (18) based on the position and/or the orientation of the tool disposed on the manipulator (18) relative to the mobile platform (12) by the control unit (38).

9. The method (1000) as claimed in claim 8, wherein the position and/or the orientation is determined by recording and evaluating first image data (68) of a location marking (36) disposed on the manipulator (18) and second image data (70) of an external location marking (66) disposed separately from the construction robot (10).

* * * * *